(12) United States Patent
Fleissner et al.

(10) Patent No.: US 9,599,190 B2
(45) Date of Patent: Mar. 21, 2017

(54) CONVEYOR BELT OR DRIVE BELT

(75) Inventors: Ulrike Fleissner, Hannover (DE);
Torsten Buch, Wedemark (DE);
Claudius Hayduk, Hannover (DE);
Peter Meyer, Hannover (DE)

(73) Assignee: FORBO SIEGLING GMBH, Hannover (DE)

( * ) Notice: Subject to any disclaimer, the term of this patent is extended or adjusted under 35 U.S.C. 154(b) by 278 days.

(21) Appl. No.: 14/358,242

(22) PCT Filed: Nov. 18, 2011

(86) PCT No.: PCT/DE2011/075279
§ 371 (c)(1),
(2), (4) Date: May 15, 2014

(87) PCT Pub. No.: WO2013/071900
PCT Pub. Date: May 23, 2013

(65) Prior Publication Data
US 2014/0296012 A1    Oct. 2, 2014

(51) Int. Cl.
*F16G 1/21* (2006.01)
*F16G 1/10* (2006.01)
*B65G 15/34* (2006.01)

(52) U.S. Cl.
CPC .......... *F16G 1/21* (2013.01); *B65G 15/34* (2013.01); *F16G 1/10* (2013.01)

(58) Field of Classification Search
CPC .............. B65G 15/34; F16G 1/10; F16G 1/21
USPC ................... 474/261, 262; 428/36.3
See application file for complete search history.

(56) References Cited

U.S. PATENT DOCUMENTS

| | | |
|---|---|---|
| 3,205,119 A | 9/1965 | Paul |
| 5,164,241 A | 11/1992 | Andre De La Porte et al. |
| 2004/0065529 A1 | 4/2004 | Cediel et al. |
| 2004/0121869 A1 | 6/2004 | Becella |
| 2009/0014084 A1 | 1/2009 | Hawkins et al. |
| 2009/0202764 A1* | 8/2009 | Tonon ............... B60C 9/0042 428/36.3 |
| 2009/0233746 A1 | 9/2009 | Leighton et al. |

FOREIGN PATENT DOCUMENTS

| | | |
|---|---|---|
| EP | 0309605 A | 4/1989 |
| EP | 0380971 B1 | 8/1990 |
| JP | 63218413 A | 9/1988 |
| JP | 2001097520 A | 4/2001 |

(Continued)

OTHER PUBLICATIONS

The Economist, Nov. 29, 2009, Your Plastic Pal. http//www.economist.com/node/14960045.*

*Primary Examiner* — William E Dondero
*Assistant Examiner* — Robert T Reese
(74) *Attorney, Agent, or Firm* — Leydig, Voit & Mayer, Ltd.

(57) ABSTRACT

A belt, configured as a conveyor belt or drive belt, includes at least one traction member having an outer side. The traction member includes at least one of a renewable raw material or a biologically degradable raw material. A coating is disposed on the outer side of the at least one traction member and includes at least one of a renewable raw material, a biologically degradable raw material, or a synthetically produced and biologically degradable raw material.

18 Claims, 2 Drawing Sheets

(56) References Cited

FOREIGN PATENT DOCUMENTS

| JP | 2010037679 A | 2/2010 |
|----|--------------|--------|
| WO | WO 9746470 A1 | 12/1997 |
| WO | WO 02062682 A1 | 8/2002 |
| WO | WO 02081945 A1 | 10/2002 |

* cited by examiner

CONVEYOR BELT OR DRIVE BELT

CROSS REFERENCE TO RELATED APPLICATIONS

This application is a U.S. National Phase Application under 35 U.S.C. §371 of International Application No. PCT/DE2011/075279, filed on Nov. 18, 2011. The International Application was published in German on May 23, 2013 as WO2013/071900 A1 under PCT Article 21 (2).

FIELD

The invention relates to a belt configured as a conveyor belt or drive belt, comprising at least one traction member, wherein at least one traction member is provided on its outer side with a coating, in particular a functional coating.

BACKGROUND

Conveyor belts of this type are known for conveying items in a large number of sectors. Depending on the type of items to be transported, such as, for example, luggage, food or bulk materials, these conveyor belts have to satisfy different requirements. In the longitudinal direction, because of the generally very long conveying sections, a small expansibility together with a bendability are required for guidance along a drive and deflection drum. The textile inserts acting as traction and strength members substantially determine the properties here of a conveyor belt with respect to tensile strength, expansibility and transverse rigidity. The desired strength with a high service life is achieved, for example, by using flat woven fabric inserted in multi-layers.

The longitudinal and transverse stability can be further increased by the arrangement of two or more layers of a carrier woven fabric.

WO 97/46470 A1 describes a conveyor belt for food, in particular for use in machines for preparing food, as are used, for example, in bakery machines. The conveyor belts made of cotton woven fabrics or cotton felts are used to pick up dough parts from moulds and to deliver them to transfer stations.

In order to overcome the known disadvantageous large expansion of the cotton material already after a few hours or days of starting up that can lead to the non-usability of the belt, the needle-punched nonwoven is equipped with an impregnation by a binder compound of a plastics material dispersion. A high inner strength of the conveyor belt, which guarantees small expansions of the material with long service lives, is achieved by this while continuing to maintain the resilience. This can also be assisted by introducing a traction member in the form of a woven fabric.

EP 0 380 971 B1 relates to a conveyor belt consisting of a woven fabric-reinforced plastics material web with textile reinforcement inserts, which extend in the longitudinal direction and are made of crossing warp and weft threads. In order to achieve a good overall strength, a reinforcement insert, formed by a strength member in the form of a double pile woven fabric, is used. Polyester fibres are suitable for this because of the small expansion. Furthermore, mixed fibres, for example made of polyester and cotton or polyamide and rayon staple, can be used.

SUMMARY

In an embodiment, the present invention provides for a belt, configured as a conveyor belt or drive belt including at least one traction member having an outer side. The traction member includes at least one of a renewable raw material or a biologically degradable raw material. A coating is disposed on the outer side of the at least one traction member and includes at least one of a renewable raw material, a biologically degradable raw material, or a synthetically produced and biologically degradable raw material.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
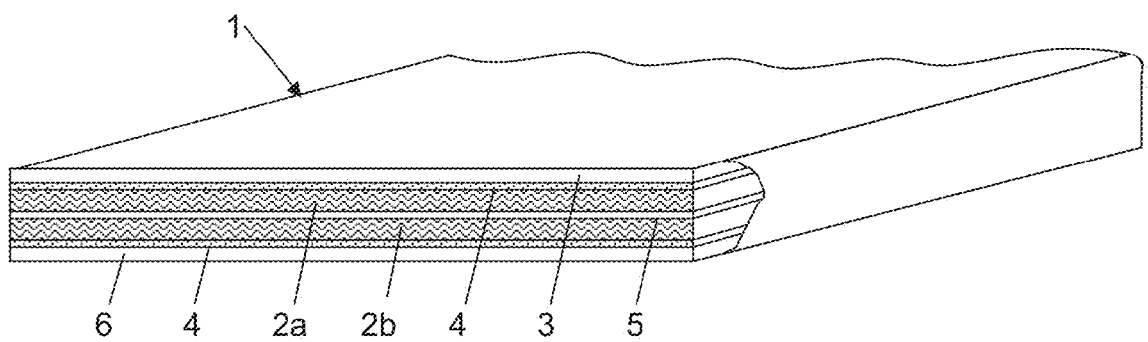
FIG. 1 shows a belt according to the invention in a perspective, partly sectional view.

An aspect of the present invention provides a belt that substantially reduces the environmental impact connected with the production and use.

The material of the traction member thus consists, according to an embodiment of the invention, of a renewable raw material and the material of the coating substantially consists of a biological or a synthetically produced and biologically degradable raw material. Surprisingly, owing to this combination according to the invention of the traction member material and the coating material, the desired properties of synthetic belts are achieved, which are neither of biological origin nor are they biologically degradable, such as, for example, polyester, polyamide or aramid. The invention is based on the surprising recognition that the low expansion required for safe and permanent operation is achieved by the combination of the traction member material in conjunction with a material consisting of a biological raw material or biologically degradable raw material for the coating. Contrary to prejudice amongst specialists, a material combination of this type, which was previously considered at best for static use purposes, is also suitable for dynamic use conditions, such as occur in drive and conveyor belts due to alternating bending loads and cyclic expansion. At the same time, the energy consumption is reduced by the reduced coefficient of sliding friction during operation of the belt. A shortening of the life cycle of the belt according to the invention is not to be feared. Rather, tests to date indicate an increased service life in comparison to the drive and conveyor belts known according to the prior art.

In this case, it proves to be particularly advantageous if the traction member consists of cellulose fibres or polylactides, which are either used separately according to the individual type or else in combination with one another. In this context, woven fabric bonds can also be realised, in particular, which, because of their design structure, counteract the expected high degree of expansion. For example, polylactides are distinguished by their good thermal formability allowing an optimal binding of the traction member material. Polylactide materials of this type are biocompatible and biologically degradable and can be obtained from a renewable raw material.

A low-expansion woven fabric configuration is preferably realised by traction member warp threads with a low incorporation, in other words by a high-deep alternation of the warp threads or by traction member warp threads lying completely straight. For example, a woven fabric configuration of this type can be realised by a large number of pairs of weft threads arranged next to one another, which form an upper layer of weft threads and a lower layer of weft threads, and with a large number of warp threads, each warp thread extending over at least one of the pairs of weft threads in the upper layer and below at least two pairs of weft threads in the lower layer, which are arranged adjacent to at least one of the pairs of weft threads.

Moreover, the woven fabric configuration may consist of crossing warp and weft threads with at least one woven fabric layer, in which the pile threads connect the upper and lower woven fabric by means of a V-bond or pile through-bond.

A particularly advantageous configuration of the invention is also realised in that the belt has a plurality of traction members in each case connected by an intermediate layer in order to thus further improve the loadability of the traction member without substantially limiting the desired flexible properties. Obviously, the intermediate layer can engage in the woven fabric structure of the traction member in order to thus counteract the expansion of the traction member.

The coating can preferably have, as an important material proportion, a biologically degradable polyvinyl chloride or polyurethane, the material properties of which are known per se, in order to thus provide a problem-free exchange or replacement possibility for existing belts. In particular, features in the belt according to the invention that are comparable to or coincide with conventional commercial belts can thus be realised, so an adaptation of the belt facility, in particular the guides or the drives, is unnecessary.

Furthermore, it has also proven to be sensible if the coating has, as an important material proportion, a polylactide or a polyethylene based on biological or synthetic raw materials, polyester or starch-based polymer, which is biologically degradable.

The coating could be applied directly to the traction member. On the other hand, it is particularly practical if the coating is connected to the traction member by means of an adhesive layer in order to thus optionally be able to realise a later separation of the traction member from its respective coating for recycling purposes. For example, adhesive layers can be used for this, which almost completely lose their adhesive force under a certain external influence.

Furthermore, it proves to be particularly promising if the traction member, on its surface remote from the coating, is equipped with a friction-reducing layer or impregnation, which, for example, has a natural wax as an important constituent. As a result, the energy consumption occurring during operation of the belt is significantly reduced and the environmental compatibility is therefore further improved. As the fibre structure of the bio-based woven fabric provides a great deal of space for storage of the friction-reducing material, the long-term effect of this coating is also positively influenced.

FIG. 1, in a schematic view, shows a belt 1 according to the invention with two traction members 2a, 2b made of a renewable raw material, the upper traction member 2a being provided with a coating 3 on its outer side. This coating 3 substantially consists of a biological raw material and is connected to the traction member 2a by means of an adhesive layer 4. The traction members 2a, 2b are connected to one another by an intermediate layer 5. On its side remote from the upper traction member 2a and its coating 3, the lower traction member 2b is equipped, on its surface, with a friction-reducing layer 6 made of a natural wax. Both the adhesive layer 4 and the intermediate layer 5 may be releasable in order to thus allow a separation of the materials according to the individual type after the end of serviceability.

Figure 2:
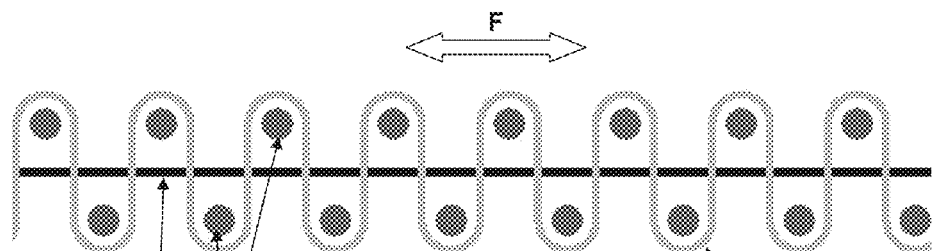
FIG. 2 shows a traction member with traction member threads arranged in one plane and weft threads arranged in two planes.
Figure 3:
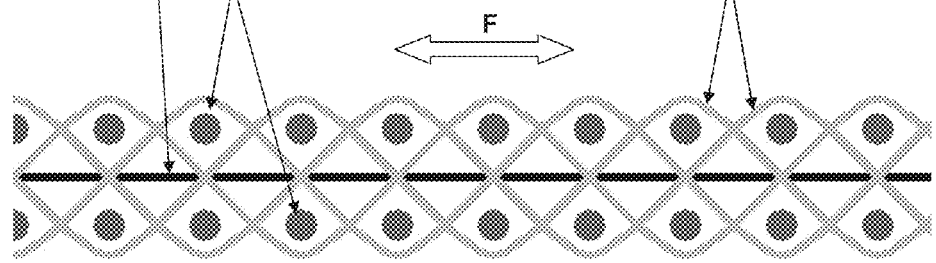
FIG. 3 shows a further traction member with traction member threads arranged in one plane and weft threads arranged in two planes.

FIGS. 2 and 3 in each case show a traction member, the traction member threads 7 of which extend in a single thread plane in the conveying direction F of the belt 1 shown in FIG. 1, while the weft threads 8 run above and below the plane of the traction member threads 7 in a respective plane. In contrast to FIG. 2, in the traction member shown in FIG. 3, the binding warp threads 9 run in a manner crossing one another.

Figure 4:
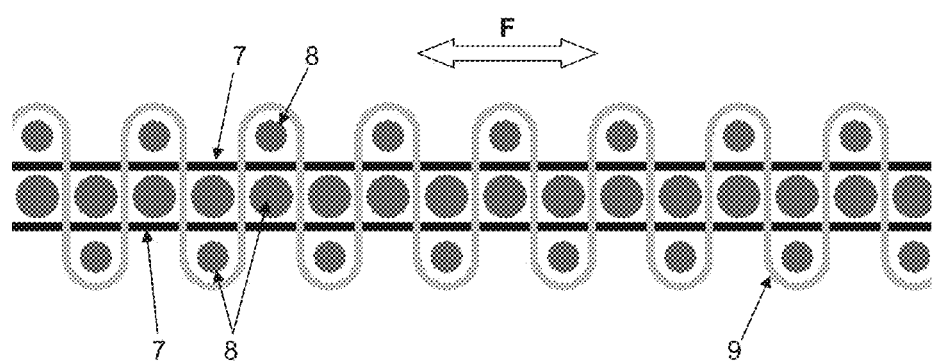
FIG. 4 shows a traction member with traction member threads arranged in two planes and weft threads arranged in three planes.

In contrast, FIG. 4 shows a traction member with traction member threads 7 arranged in two planes and weft threads 8 arranged in three planes. The binding warp threads 9 in this case surround both the planes of the traction member threads 7 and the planes of the weft threads 8.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A belt configured as a conveyor belt or drive belt, the belt comprising:
   at least one traction member having an outer side and including at least one of a renewable raw material or a biologically degradable material; and
   a coating disposed on the outer side of the at least one traction member, the coating including a renewable and biologically degradable raw material.

2. The belt recited in claim 1, wherein the traction member includes at least one of cellulose fibres, cellulose lignin, or polylactides.

3. The belt recited in claim 1, wherein the at least one traction member includes a plurality of traction members that are connected, respectively, by an intermediate layer.

4. The belt recited in claim 1, wherein the coating includes a polylactide.

5. The belt recited in claim 1, wherein the coating is connected to the traction member by an adhesive layer.

6. The belt recited in claim 1, wherein the traction member includes a surface remote from the coating, the surface being equipped with a friction-reducing layer.

7. The belt recited in claim 6, wherein the friction-reducing layer includes a natural and biologically degradable wax.

8. The belt recited in claim 6, wherein the at least one traction member includes a plurality of traction members that are connected to one another by an intermediate layer.

9. The belt recited in claim 1, wherein the coating and/or the material of the at least one traction member includes starch-based raw materials.

10. The belt recited in claim 9, wherein the coating and/or the material of the at least one traction member includes at least one of PLA, PES or cellulose.

11. The belt recited in claim 1, wherein the coating and/or the material of the at least one traction member includes sugar-based raw materials.

12. The belt recited in claim 11, wherein the coating and/or the material of the at least one traction member includes at least one of PE, PBS or polyamide.

13. The belt recited in claim 1, wherein the at least one traction member includes at least one thread plane with stretched traction member threads made of at least one of multi-filaments, staple fibres, or monofilaments.

14. The belt recited in claim 13, wherein the at least one thread plane extends in the direction of the main extent of the belt.

15. The belt recited in claim 13, wherein the at least one thread plane extends transversely to the main extent of the belt.

16. The belt recited in claim 13, wherein the traction member threads of the at least one thread plane are connected by binding warp threads with a high crimp.

17. The belt recited in claim 16, wherein the bind warp threads include at least one of renewable raw materials or biologically degradable raw materials.

18. The belt recited in claim 13, wherein the traction member threads include at least one of renewable raw materials or biologically degradable raw materials.

* * * * *